Figure 1:
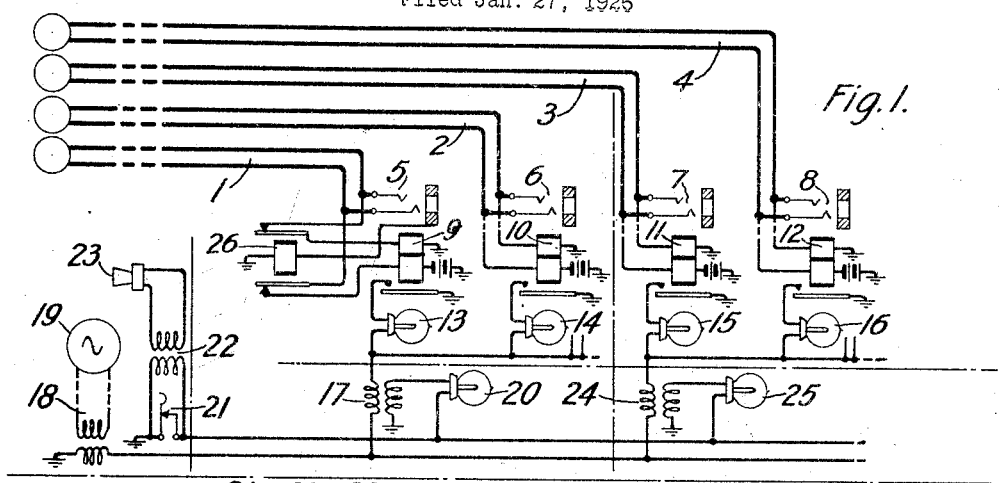

Sept. 6, 1927.

H. W. O'NEILL 1,641,450

TELEPHONE SYSTEM

Filed Jan. 27, 1926

Inventor:
Henry W. O'Neill
by J. G. Roberts  Atty.

Patented Sept. 6, 1927.

1,641,450

UNITED STATES PATENT OFFICE.

HENRY W. O'NEILL, OF ELMHURST, NEW YORK, ASSIGNOR TO WESTERN ELECTRIC COMPANY, INCORPORATED, OF NEW YORK, N. Y., A CORPORATION OF NEW YORK.

TELEPHONE SYSTEM.

Application filed January 27, 1926. Serial No. 84,014.

This invention relates to telephone systems, and more particularly to a system and apparatus for employing alternating currents as energy for the illumination of switchboard signal lamps.

In present systems current from storage batteries has usually been employed for energizing switchboard signals, and it has been necessary to provide relays in addition to the usual line relays in order to provide for the control of signals auxiliary to the line signals proper.

In employing alternating current it is possible to readily meet any desired potential condition by placing transformers of suitable ratio in the supply leads, while the energy may be taken directly from mains which afford the usual commercial current supply in a community. In coordinating the present system, pilot or auxiliary signals and night alarm signals which may be in association with line and supervisory signals, may be controlled without the use of secondary or auxiliary signal relays.

In the present system, where alternating currents are employed for the energization of signals, it is only necessary to provide direct current substantially for use in the telephone transmitters. Such energy is usually referred to as talking current. Therefore, a material saving in power and storage battery plant may be had while the actual cost of energy from commercial mains is small compared with the cost of energy when taken from a secondary or storage battery system. In dispensing with the auxiliary signal control relays, a saving in first cost and also a saving in maintenance cost is realized, while more effective and reliable service is also had due to elimination of such devices.

In line with the foregoing, it is the principal object of the present invention to provide a more economical and reliable telephone exchange system.

A first feature of the invention relates to the employment of transformers in substitution of relays for the control of auxiliary signals.

A second feature relates to the employment of transformers having a plurality of windings for isolating the circuits of different auxiliary signals in substitution of relays which require a plurality of independent contacts in order to afford a corresponding circuit isolation under systems in which the signal energy is from direct current sources.

A third feature provides that the transformers above mentioned in connection with the first and second features be so proportioned that they may be substantially saturated, in a magnetic sense, under a minimum current strength, while the primary winding of the transformers may be capable of carrying current of a strength considerably in excess of such saturating current.

A fourth feature relates to the employment of signal lamps capable of affording a suitable degree of illumination for signaling purposes under a wide range of changes or variations in current potential, the lamps preferably to be of a type having a positive coefficient of resistance as lamps with filaments of such material as tungsten.

A fifth feature relates to the use of step-down transformers for reducing the potential of a current supply to such point as may best meet the circuit conditions of a telephone switching system, and also to best meet the potential requirements of signals in any given situation.

Figure 2:
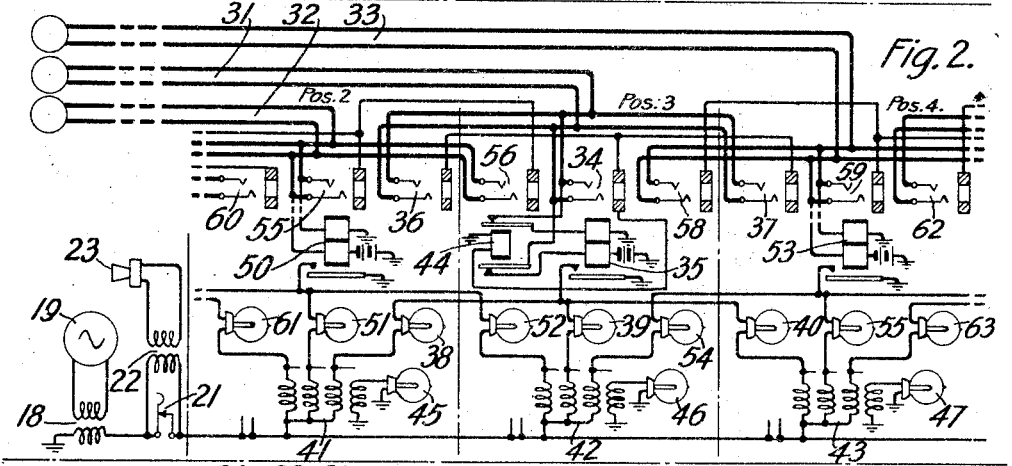
Figure 3:
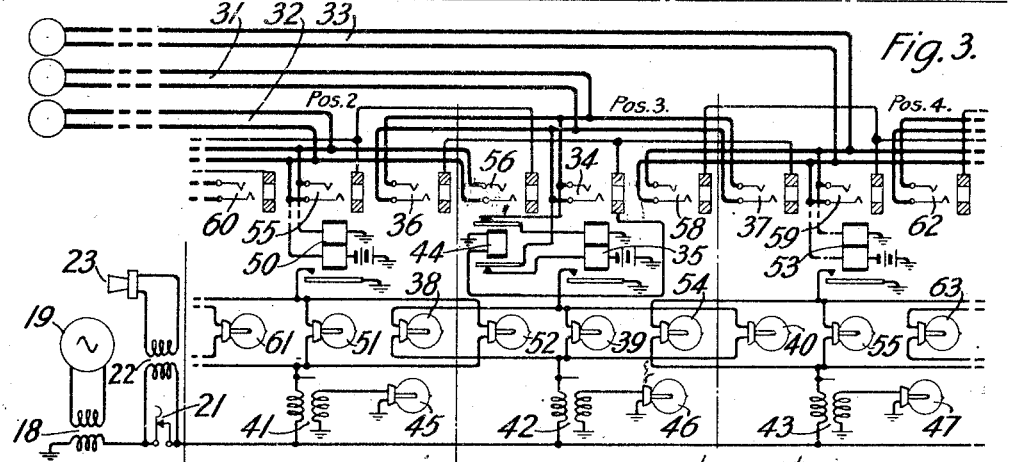

This invention is illustrated diagrammatically in the accompanying drawing, in which Fig. 1 shows a system of lines having signals arranged on the so called non-multipled basis, with other signals in the form of respective pilot or auxiliary signals and a common signal usually referred to as a night alarm signal;

Fig. 2 shows an arrangement which differs from the arrangement of Fig. 1 principally in that the line and the auxiliary signals are arranged on the so called multiple basis, while Fig. 3 shows an arrangement which differs from the arrangement of Fig. 2 principally in that the auxiliary signals are not arranged on a multipled basis.

Throughout the various figures of the drawing, like characters of reference have been employed to indicate like and corresponding parts and devices.

In describing this system, reference will first be had to Fig. 1 of the drawing in which line circuits 1, 2, 3 and 4 terminate at respective jacks 5, 6, 7 and 8 having associated line relays 9, 10, 11 and 12 and line lamp signals 13, 14, 15, and 16.

Let it now be assumed that a call has originated on the line circuit 1. By means not shown but well understood in the art, an obvious circuit is completed from grounded battery through the windings of the relay 9 and a loop formed of the line 1. Response of the relay 9 completes a circuit which includes a line lamp 13, primary winding of a transformer 17 and the secondary winding of a supply transformer 18. The latter transformer may be energized from service mains extending to an alternating current source 19. Alternating current may now illuminate the line lamp 13 and energize the transformer 17 to also effect illumination of an auxiliary signal lamp 20 which is connected to include the secondary winding of the transformer 17 and the contacts of a key 21. In case the key 21 may be in its operated position, its contacts separated, the current for the signal 20 may then traverse the primary winding of a transformer 22 and effect energization of an audible night call signal 23. The latter signal as connected to the secondary winding of the transformer 22, is preferably of such a type as may respond directly to the periods or frequency of the alternating current supplied from the source 19. The frequency of this current may be at the common rate of 60 cycles per second or at any other of the commercial or special frequencies.

As is well understood in the art, current from grounded battery by way of the sleeve conductor of a cord circuit, not shown, may reach the sleeve member of the jack 5 and complete a circuit to ground through the winding of a cut-off relay 26 when the present assumed call is answered. Under operation, the relay 26 disconnects the line relay 9 which may restore and extinguish the line lamp 13 and also effect deenergization of the transformer 17 and the auxiliary signal 20.

Under a call over the line 2, the relay 10 may respond and effect energization of the associated line lamp 14 over the common path already traced by way of the transformers 17 and 18. This also effects energization of the pilot or auxiliary signal 20. The signal 20 may be common to a plurality or group of line signals comprising a panel in which the line signals 13 and 14 may be present.

Under a call from the line 3, response of the relay 11 completes the circuit over the secondary winding of the transformer 18 by way of the primary winding of a transformer 24 to illuminate the associated line lamp 15. Energization of the transformer 24 effects illumination of the auxiliary signal 25. The circuit for the latter signal is by way of the closed contacts of the key 21 which are now in shunt on the lamp 20 and the secondary winding of the transformer 17, relative to the current for the lamp 25. The primary winding of the transformer 22 is of relatively low resistance so that when the key 21 may be opened for operation of the audible signal 23, the shunt relative to the lamp 20 when the lamp 25 is lighted and vice versa, may be sufficiently low to prevent illumination of the lamp 20 under such current.

From the description already given it will be obvious that a call originating on the line 4 may effect operation of the relay 12 to energize the line signal 16 and also the auxiliary signal 25.

It may be understood that the equipment of lines 1 and 2 with the associated auxiliary signal 20 may form, with other line equipments, a panel group at one operator's position at the left of the vertical line shown in the drawing. In a like manner the equipment of lines 3 and 4 with the auxiliary signal 25 may form part of the panel equipment at another operator's position at the right of the vertical line. As indicated in the drawing, the bus conductors from the primary windings of the transformers 17 and 24 may branch to other line signals, not shown, but which may be present in the respective panels.

When desired, the transformer 18 may be of a suitable step-down type. In certain situations this may be an equal ratio transformer inserted merely as an isolating protection between the service or supply mains and a telephone switchboard. However, in situations where the potential of the mains may be suitable and where circuit isolation is not required, the transformer 18 may be dispensed with and the supply mains may then be connected directly to the circuits now connected to the secondary winding of the transformer 18.

The transformers 17 and 24 may be proportioned substantially to be saturated by a strength of current required for a single line lamp, thereby preventing excess potential on the signals 20 and 25 during intervals a plurality of the line lamps may be lighted at the same time. The primary windings of the transformers 17 and 24 should preferably be of low resistance so that the impedance will not cause an excessive potential drop in the common circuit when several line lamps of one panel may be lighted at one time.

The signal lamps 13—16 and 20 and 25 should preferably be of the type above mentioned in which the filaments may be of tungsten and thus adapted to afford a suitable degree of illumination through a relatively wide range of potential variation. Such variation of potential may, in general, originate on the supply mains, but may also be due to some extent to potential drop on the common or primary windings of the transformers 17 and 24, through which current is supplied to the line lamps of the panels.

In describing the arrangement of Fig. 2 wherein the answering jacks and line lamps are multipled, the 3 vertical lines serve to separate the equipment of three positions which have been indicated as Pos. 2, Pos. 3 and Pos. 4. In this multiple plan, a line 31 terminates in a jack 34 and a line relay 35 at the position 2 where, for convenience, this position may be designated as the "home" position for this line 31. An answering jack 36 in position 2 and an answering jack 37 in position 4 are multipled to the line 31. Line lamps 38, 39 and 40 are respectively associated with the jacks of the line 31 in the positions 2, 3 and 4.

Assuming now that a call is present on the line circuit 31, grounded battery may be closed through a circuit which includes the windings of the relay 35. Response of this relay completes a circuit which may be traced from ground, the secondary winding of the current supply transformer 18, contacts of the key 21 thence branching, first through the next right-hand winding of a transformer 41 and line lamp 38, second, through the next left-hand winding of a transformer 42 and lamp 39, and third, through the left-hand winding of the transformer 43 and the line lamp 40. After merging, the three branch paths extend to ground through the contacts of the relay 35, now assumed to be in its operated position. The current of the line lamps 38, 39 and 40 respectively energizes the transformers 41, 42 and 43, thereby effecting illumination of the respective auxiliary signals 45, 46 and 47. In this arrangement the key 21 is present in the current supply of the line lamps rather than in the circuit of the auxiliary signal lamps as in the arrangement of Fig. 1. When the key 21 is operated in removing the shunt from the primary winding of the transformer 22, the current for the line lamps may traverse this transformer winding and effect operation of the audible signal 23.

The principal object in multiplying the calling equipment of the line 31 is to provide that calls may be answered with the least delay. Therefore, at either of the 3 positions insertion of the plug of a cord not shown, into the respective jack of this line may apply current over the sleeve conductor to effect response of a cut-off relay 44 to disconnect the line relay 35 and thus deenergize all of the line signals 38, 39, 40 and also the 3 auxiliary signals 45, 46 and 47.

Under a call from the line 32, response of a line relay 50 to current from grounded battery over obvious circuits, completes a path which may be traced from ground through the secondary winding of the current supply transformer 18, the contacts of the key 21, thence branching to three paths, first, the middle primary winding of transformer 21 and line lamp 51, second, the left-hand primary winding of transformer 42 and a line lamp 52, and a third path, not shown, but which may include the winding of a transformer and a line lamp at a position 1 which may be understood as present at the left of the position 2. The three paths just traced converge to ground through the contacts of the line relay 50 now assumed as in its operated position. This effects energization of the line signals 51, 52, associated auxiliary signals 45 and 46 and also energization of a line lamp and an associated auxiliary signal assumed as present at a position 1. This call may be answered at the jack 55 of position 2 which is the "home" position for this line 32, or the call may be answered at jack 56 of the position 3 or at a jack at the assumed position 1. A cut-off relay, not shown, corresponding to the cut-off relay 44 of the line 31 will be energized when the call is answered, thereby effecting release of the line relay 50 to extinguish the line lamps 51, 52, auxiliary lamps 45, 46 and also the line lamp and auxiliary signal which would be present at the assumed position 1.

It will now be obvious that for a call over a line 33 a line relay 53 at position 4 which is the "home" position for this line may respond, effecting energization of line signals 54, 55, pilot signals 46 and 47 and also a line signal and an auxiliary signal at a position 5 which may be assumed as present at the right of the position 4. This call may be answered at either a jack 58 in position 3, a jack 59 in position 4 or a jack which would be present at the assumed position 5. A cut-off relay, not shown, similar to the relay 44 may be understood as present for the line 33 for disconnecting the line relay 53 and in turn, the line and auxiliary signals just described as energized under the assumed call from this line 33.

A jack 60 and a line signal 61 may be understood as multipled to a line circuit for which a position 1 may form the "home" position while a jack 62 and a line signal 63 would be multipled to a line circuit for which a position 5 would be the "home" position.

In the arrangement of Fig. 3 the three line lamps of each line are connected in parallel to receive current through the primary winding of the auxiliary signal control transformer of the respective home position. Therefore, although three line lamps will be energized under a call only the auxiliary signal of the "home" position will be displayed. For this service two windings from each of the transformers 41, 42 and 43 may be eliminated as shown in Fig. 3. From the description already given of this system, particularly in connection with the arrangement of Fig. 2, it is believed that the operation of the alternate arrangement shown in Fig. 3 will be obvious and further description will therefore be unnecessary.

From the description given, it will be clear that the answering jacks of the line circuits of a switchboard may be multipled in the order shown, whereby a line lamp with an associated auxiliary signal may be controlled in each one of three operator's positions in an order of progressive multipling throughout the length of a switchboard. The line lamps which may be connected for control by a single line relay may, for convenience, be referred to as comprising sub-groups in distinguishing such groups from the lamp groups of the panels or positions. Due principally to the use of alternating current as the energy agent for the signals, suitable coordination of the devices and circuits have been made possible to the end that without the employment of auxiliary signal relays, circuit separation is had so that no overlapping effects may take place and only such line lamps and auxiliary signals may be energized under a call as may be respectively associated with a line and with a panel or position concerned in answering a given call.

While this system has been illustrated and described more particularly in connection with call and line signals, it will be understood that alternating current may also be employed in a similar manner with supervisory signals and their associated auxiliary signals.

What is claimed is:

1. In a telephone switching system, a plurality of line circuits, a lamp signal for each line, a lamp signal common to the lamp signals of the lines, means including a source of alternating current for energizing any of said first mentioned lamps, and a transformer energized by the current for said lamps for energizing the common lamp signal.

2. In a telephone switchboard, a plurality of line lamps and an auxiliary signal lamp having the characteristics of a tungsten filament lamp, a source of alternating current, a transformer to supply energy to said auxiliary lamp, and circuit means including respective line relays for applying current from said source by way of said transformer to energize said line lamps.

3. In a telephone switchboard, a plurality of line lamps for each of panels, a plurality of line lamps for each panel, an auxiliary lamp for each panel, a transformer for each panel having a winding in series with the line lamps of the panel and a winding in series with the auxiliary lamp of the associated panel, a source of alternating current, and circuit means including line relays for applying said alternating current to energize said line lamps and said auxiliary lamp.

4. In a telephone exchange system, a plurality of groups of line lamps, an auxiliary lamp for each of said groups, a source of alternating current, a plurality of circuits each including a lamp in each of said groups to form sub-groups, means for applying said current to said circuits for respectively energizing lamps of said subgroups, and a transformer for each group of line lamps energized by the current for the line lamps for respectively energizing said auxiliary lamps.

5. In a telephone switchboard, a plurality of panels, a plurality of line lamps for each panel, an auxiliary lamp for each panel, a source of alternating current, relay means associated with each line lamp for effecting its energization from said source, and a transformer for each panel to direct the energy applied to the corresponding line lamps also to energize the respective auxiliary lamp.

6. In a telephone switchboard, a plurality of operator's positions, a plurality of line lamps for each position, an auxiliary signal for each position, a source of alternating current, a transformer for each position, circuit means including said transformer for establishing multiple groups formed of line lamps from each position and means including line relays for applying current from said source to energize said transformer in illuminating respective groups of the line lamps and also illuminating respectively associated auxiliary lamps.

7. In a telephone switchboard, a plurality of line lamps, a source of alternating current, a step-down transformer, an auxiliary signal lamp, a transformer for said auxiliary signal lamp, and line relays for applying current from said source by ways of said step-down transformer to energize said line lamps and said auxiliary signal lamp.

8. In a telephone switchboard, a plurality of line lamps, a source of alternating current, a transformer having a winding to form a path from said source to said line lamps and characterized by substantial magnetic saturation of the transformer under a strength of current required for a single one of said line lamps, an auxiliary signal lamp, a winding on said transformer for said auxiliary signal lamp, and line relays for completing said path to energize respective line lamps and said auxiliary signal lamp from said source.

9. In a telephone switchboard, a plurality of panels, a plurality of line lamps in each panel, circuit means to form respective multiples of the lamps in a plurality of panels the multiples to extend progressively through the panels of the switchboard, a source of alternating current, a transformer for each panel having windings individual to respective multiples of said line lamps, an auxiliary lamp to be energized from each transformer, and means for applying current from said source to energize multiples of said line lamps and said transformers.

10. In a telephone switchboard, a plurality of line lamps and an auxiliary lamp of a type to afford a uniform degree of illumination over a wide range of potential variation, a transformer for said auxiliary lamp proportioned to afford a high degree of magnetization under a strength of current sufficient for a single one of said line lamps, a source of alternating current, and circuit means including line relays for applying current from said source to energize the line lamps and said transformer.

11. In a telephone switchboard, a plurality of panels, a plurality of line signal lamps for each panel, an auxiliary signal lamp for each panel, an audible signal common to all of said panels, a first transformer for said auxiliary signal lamp, a second transformer for said audible signal, a source of alternating current, line relays for energizing said transformers in applying current from said source to said line lamps respectively, and means for disabling said audible signal independently of the other signals.

12. In a telephone switchboard, a plurality of panels, a plurality of line lamps in each panel, an auxiliary lamp for each panel, circuit means for establishing a plurality of orders of multipling said line lamps progressively through said panels, a source of alternating current, line relays for applying current from said source to energize said line lamps, a transformer for each panel traversed by the current for the line lamps for energizing said auxiliary lamps, and pluralities of windings on said transformers for affording circuit separation of said auxiliary lamps.

13. In a telephone switchboard, a plurality of consecutively numbered positions, line lamps for each position, an auxiliary lamp for each position, a transformer for each auxiliary lamp, circuit means including said transformers for multipling said line lamps to include a lamp in one even and two odd numbered positions or a lamp in one odd and two even numbered positions, and circuit means including said transformers for routing said current to energize respective groups of said line lamps and such of the auxiliary lamps only as may be associated with the positions in which the line lamps may be under energization.

14. In a telephone switchboard, a plurality of panels, a plurality of line lamps for each panel, circuit means for multipling a line lamp in one panel with line lamps in panels at the left and at the right of this panel, this order of multipling to extend throughout the panels of the switchboard, a source of alternating current, a transformer for each panel having a winding corresponding with each order of the multipling of the line lamps, an auxiliary lamp for each panel, a winding on each transformer for the associated auxiliary lamp and means for applying current from said alternating current source respectively to energize a multiple group of said line lamps and the transformers of the panels in which the energized lamps may be located.

15. In a telephone switchboard, a first panel, a plurality of line lamps in said panel, an auxiliary lamp for said panel, other panels equipped in duplicate of said first panel and positioned on each side of the first panel, circuit means for establishing a first multiple order of said line lamps so that a lamp in the first panel may be associated with lamps respectively in panels to the left and to the right of the first panel, means for establishing a second multiple order of said line lamps so that a lamp in said first panel may be associated with lamps in panels to the left of the first panel, means for a third multiple order so that a lamp in said first panel may be associated with lamps in panels to the right of the first panel, a source of alternating current, a transformer having a winding for each of said multiple orders of said line lamps for supplying current to such lamps, a winding on each transformer for the respectively associated auxiliary signal lamp, and circuit means including line relays for applying current from said source respectively to energize said line lamps and the associated auxiliary signal lamps.

16. In a telephone system, a plurality of line lamps, an auxiliary lamp, a source of alternating current, and means for energizing said line lamps individually and for energizing said auxiliary lamp from said source of alternating current, said means including a transformer having such characteristics that the terminal voltage of the secondary winding is substantially independent of the current flowing through the primary winding thereof over a wide range.

17. In a telephone system, a plurality of line lamps, an auxiliary lamp, a source of alternating current, means for energizing said line lamps individually from said source and means responsive thereto for producing a substantially uniform illumination of said auxiliary lamp, said last means comprising in combination a transformer having such characteristics that the terminal voltage of the secondary winding is substantially independent of the current flowing through the primary winding thereof over a wide range and a filament for said auxiliary lamp having such characteristics that the illumination produced is substantially independent of the current flowing therethrough over a wide range.

In witness whereof, I hereunto subscribe my name this 22 day of January, A. D. 1926.

HENRY W. O'NEILL.